(12) United States Patent
Wu et al.

(10) Patent No.: US 9,893,930 B2
(45) Date of Patent: Feb. 13, 2018

(54) METHOD AND DEVICE FOR PROCESSING DATA FORWARDING

(71) Applicant: ZTE CORPORATION, Shenzhen, Guangdong Province (CN)

(72) Inventors: Shihua Wu, Shenzhen (CN); Juan Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 121 days.

(21) Appl. No.: 14/907,294

(22) PCT Filed: May 28, 2014

(86) PCT No.: PCT/CN2014/078661
§ 371 (c)(1),
(2) Date: Jan. 25, 2016

(87) PCT Pub. No.: WO2014/177100
PCT Pub. Date: Nov. 6, 2014

(65) Prior Publication Data
US 2016/0164717 A1    Jun. 9, 2016

(30) Foreign Application Priority Data

Jul. 29, 2013   (CN) .......................... 2013 1 0322944

(51) Int. Cl.
*H04L 12/28* (2006.01)
*H04L 12/24* (2006.01)
(Continued)

(52) U.S. Cl.
CPC ...... *H04L 41/0668* (2013.01); *H04L 12/6418* (2013.01); *H04L 45/50* (2013.01); *H04L 61/2592* (2013.01)

(58) Field of Classification Search
CPC . H04L 12/6418; H04L 41/0668; H04L 45/50; H04L 61/2592
See application file for complete search history.

(56) References Cited

U.S. PATENT DOCUMENTS

| | | | |
|---|---|---|---|
| 2004/0037275 A1 | 2/2004 | Li et al. | |
| 2006/0133265 A1 | 6/2006 | Alcatel | |

(Continued)

FOREIGN PATENT DOCUMENTS

| | | | |
|---|---|---|---|
| CN | 101820397 A | 9/2010 | |
| CN | 102025541 A | 4/2011 | |

(Continued)

*Primary Examiner* — Charles C Jiang
*Assistant Examiner* — Ryan Kavleski
(74) *Attorney, Agent, or Firm* — Ling Wu; Stephen Yang; Ling and Yang Intellectual Property (57) ABSTRACT

A method for processing data forwarding and a Service Provider-end Provider Edge (SPE) are disclosed, including the following steps: the SPE configuring data forwarding information which includes a corresponding relationship between Multi Segment Pseudo Wires (MSPW) information and forwarding information of an MSPW protection link group or a corresponding relationship between the MSPW information and forwarding information of other MSPW except the forwarding information of the MSPW protection link group (101); the SPE receiving a service message (102) carrying the MSPW information; the SPE querying the forwarding information of the MSPW protection link group or the forwarding information of other MSPW except the forwarding information of the MSPW protection link group (103); and the SPE performing label encapsulation and forwarding according to the queried-out forwarding information of the MSPW protection link group or forwarding information of other MSPW except the forwarding information of the MSPW protection link group (104).

10 Claims, 3 Drawing Sheets

(51) Int. Cl.
    *H04L 12/64*     (2006.01)
    *H04L 12/723*     (2013.01)
    *H04L 29/12*     (2006.01)

(56) References Cited

U.S. PATENT DOCUMENTS

| | | | |
|---|---|---|---|
| 2010/0238795 A1* | 9/2010 | Boutros | H04L 45/00 |
| | | | 370/219 |
| 2012/0082025 A1* | 4/2012 | Guichard | H04L 1/22 |
| | | | 370/218 |
| 2015/0006757 A1* | 1/2015 | Boutros | H04L 45/14 |
| | | | 709/242 |
| 2016/0072703 A1* | 3/2016 | Xu | H04L 12/4633 |
| | | | 370/218 |

FOREIGN PATENT DOCUMENTS

| | | | |
|---|---|---|---|
| GB | 2450644 A | 12/2008 | |
| RU | 2003102489 A | 8/2004 | |
| WO | 2008045255 A2 | 4/2008 | |

* cited by examiner

METHOD AND DEVICE FOR PROCESSING DATA FORWARDING

TECHNICAL FIELD

The present document relates to a network data communication technology, in particular, to a method for processing data forwarding and a Service Provider-end Provider Edge (SPE).

BACKGROUND OF THE RELATED ART

Pseudo Wire Emulation Edge-to-Edge (PWE3) provides a tunnel on a packet switched network (IP/Multiple Protocol Label Switching (MPLS)), so as to emulate a layer 2 Virtual Private Network (VPN) protocol of some services (e.g., Frame Relay (FR), Asynchronous Transfer Mode (ATM), Ethernet, Time Division Multiplex Synchronous Optical Network/Synchronous Digital Hierarchy (TDM SONET/SDH)), and a traditional network and the packet switched network can be interconnected through the protocol, thereby realizing the resource sharing and network expansion.

The PWE3 is an extension to an L2VPN Martini protocol, in which a function of Multi Segment Pseudo Wires (MSPW) is added and a networking mode is extended. The MSPW means that multiple Pseudo Wires (PW) exist between a User-end Provider Edge (U-PE, also called as a user access device) and a U-PE. A forwarding mechanism of a U-PE in multiple hops is the same as a forwarding mechanism of a U-PE in a single hop, except it is needed to perform label switching of a PW Label layer on a Switching PE (S-PE) in the multi-hop forwarding. In most situations, the single-hop PW can meet practical requirements, but under the following several situations the single-hop PW cannot meet the requirements and the multi-hop PW needs to be adopted: two PEs are not in a same Autonomous System domain, and a signaling connection or a tunnel cannot be established between the two PEs; signalings on the two PEs are different, for example, one end runs a Label Distribution Protocol (LDP) and the other end runs a Resource Reservation Protocol (RSVP); if access devices can run the MPLS but have no capability to establish a large number of LDP sessions, then User Facing Provider Devices (UFPE) can be taken as U-PEs at this point, and high performance devices S-PEs can be taken as switching nodes of the LDP sessions, similar to a signaling reflector.

The function of MSPW can reduce the requirement for the number of LDP connections supported by the access devices, i.e., can reduce overheads of the LDP sessions of the access nodes; the multi-hop access nodes meet a convergence function of the PW, which makes the network more flexible and appropriate for grading (access, convergence and core). More telecom low-speed Time Division Multiplex (TDM) interfaces are supported.

In an MSPW network in the PWE3 application, when a failure occurs in a device between intermediate S-PEs, it causes that data messages cannot be forwarded successfully, so as to affect the quality of service.

SUMMARY

The technical problem required to be solved in the embodiments of the present document is to provide a method for processing data forwarding and a Service Provider-end Provider Edge (SPE), so as to solve the problem that data messages cannot be forwarded when an intermediate device fails.

In order to solve the above technical problem, the following technical solution is adopted.

The embodiment of the present document provides a method for processing data forwarding, comprising:

a Service Provider-end Provider Edge (SPE) configuring data forwarding information, wherein the data forwarding information comprises a corresponding relationship between Multi Segment Pseudo Wires (MSPW) information and forwarding information of an MSPW protection link group or a corresponding relationship between the MSPW information and forwarding information of other MSPW except the forwarding information of the MSPW protection link group;

the SPE receiving a service message, wherein the service message carries the MSPW information;

the SPE querying the forwarding information of the MSPW protection link group or the forwarding information of other MSPW except the forwarding information of the MSPW protection link group corresponding to the MSPW information carried in the service message according to the corresponding relationship between the MSPW information and the forwarding information of the MSPW protection link group or the corresponding relationship between the MSPW information and the forwarding information of other MSPW except the forwarding information of the MSPW protection link group; and the SPE performing label encapsulation and forwarding according to the queried-out forwarding information of the MSPW protection link group or the forwarding information of other MSPW except the forwarding information of the MSPW protection link group.

Optionally, the forwarding information of the MSPW protection link group comprises forwarding information of at least one effective protection link and forwarding information of at least one standby protection link.

Correspondingly, the step of performing label encapsulation according to the queried-out forwarding information of the MSPW protection link group comprises: performing the label encapsulation according to the forwarding information of the effective protection link.

Optionally, the method further comprises:

the SPE selecting one standby protection link as a new effective protection link when determining that a current effective protection link fails.

Optionally, the SPE selects from all standby protection links a protection link with a highest priority as the new effective protection link.

The embodiment of the present document provides a Service Provider-end Provider Edge (SPE), comprising: a data forwarding information management unit, a message receiving unit, a query unit and a message encapsulation and forwarding unit, wherein, the data forwarding information management unit is configured to: configure data forwarding information, wherein the data forwarding information comprises a corresponding relationship between Multi Segment Pseudo Wires (MSPW) information and forwarding information of an MSPW protection link group or a corresponding relationship between the MSPW information and forwarding information of other MSPW except the forwarding information of the MSPW protection link group;

the message receiving unit is configured to: receive a service message, wherein the service message carries the MSPW information;

the query unit is configured to: query the forwarding information of the MSPW protection link group or the forwarding information of other MSPW except the forwarding information of the MSPW protection link group corresponding to the MSPW information carried in the service message according to the corresponding relationship between the MSPW information and the forwarding information of the MSPW protection link group or the corresponding relationship between the MSPW information and the forwarding information of other MSPW except the forwarding information of the MSPW protection link group; and the message encapsulation and forwarding unit is configured to: perform label encapsulation and forwarding according to the queried-out forwarding information of the MSPW protection link group or the forwarding information of other MSPW except the forwarding information of the MSPW protection link group.

Optionally, the forwarding information of the MSPW protection link group comprises forwarding information of at least one effective protection link and forwarding information of at least one standby protection link.

Optionally, the message encapsulation and forwarding unit is configured to perform label encapsulation according to the queried-out forwarding information of the MSPW protection link group in the following way: performing the label encapsulation according to the forwarding information of the effective protection link.

Optionally, the data forwarding information management unit is further configured to configure the data forwarding information in the following way: selecting one standby protection link as a new effective protection link when determining that a current effective protection link fails.

Optionally, the SPE selects from all standby protection links a protection link with a highest priority as the new effective protection link.

With the technical solution of the present document, the forwarding performance of the PWE3 MSPW function can be improved; by implementing the MSPW protection group function of the MSPW, the service flow can be switched quickly when there is a fault on the MSPW link, thereby effectively protecting the service flow, preventing the service flow from cutting off and increasing the robustness of the MSPW network, so the requirements of the network operators can be met better.

PREFERRED EMBODIMENTS OF THE INVENTION

In order to make the skilled people in the art be able to understand the present document much better and implement the present document, the technical solution of the present document is described in detail with reference to the accompanying drawings and specific embodiments hereinafter, but the cited embodiments are not intended to limit the present document. It should be illustrated that, in the case of not conflicting, the embodiments in the present application and the features in these embodiments can be combined with each other.

Embodiment 1

Figure 1:
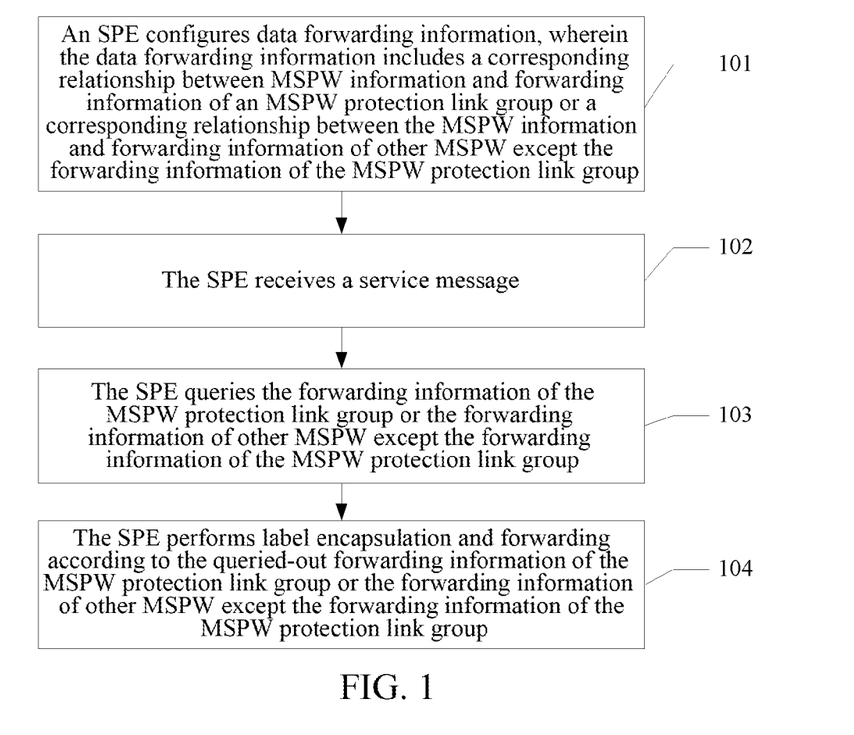
FIG. 1 is a flow diagram of a method for processing data forwarding of an embodiment 1 of the present document.

It is an embodiment 1 of a method for processing data forwarding of the present document, and as shown in FIG. 1, the method includes the following steps:

In step 101, a Service Provider-end Provider Edge (SPE) configures data forwarding information, wherein the data forwarding information includes a corresponding relationship between Multi Segment Pseudo Wires (MSPW) information and forwarding information of an MSPW protection link group or a corresponding relationship between the MSPW information and forwarding information of other MSPW except the forwarding information of the MSPW protection link group;

The forwarding information of the MSPW protection link group includes forwarding information of at least one effective protection link and forwarding information of at least one standby protection link.

In the embodiment of the present document, a form for representing the corresponding relationship between the multi segment pseudo wires (MSPW) information and the forwarding information of the MSPW protection link group or the corresponding relationship between the MSPW information and the forwarding information of other MSPW except the forwarding information of the MSPW protection link group is not limited, but it is ok that the corresponding forwarding information can be found according to the MSPW information.

Generally, when there is no protection group, the forwarding information includes a forwarding label, a PW label and an output interface. When there is a protection group, the forwarding information includes a forwarding label, an MSPW label and an output interface.

A step of the SPE managing the data forwarding information includes:

when determining that the current effective protection link fails, the SPE selecting one standby protection link as a new effective protection link.

Optionally, the SPE selects from all standby protection links a protection link with the highest priority as the new effective protection link. Of course, the new effective protection link can be selected from the standby protection links randomly.

In step 102, the SPE receives a service message, wherein the service message carries the MSPW information;

In step 103, the SPE queries the forwarding information of the MSPW protection link group or the forwarding information of other MSPW except the forwarding information of the MSPW protection link group corresponding to the MSPW information carried in the service message according to the corresponding relationship between the MSPW information and the forwarding information of the MSPW protection link group or the corresponding relationship between the MSPW information and the forwarding information of other MSPW except the forwarding information of the MSPW protection link group;

In step 104: label encapsulation is performed according to the queried-out forwarding information of the MSPW protection link group or forwarding information of other MSPW except the forwarding information of the MSPW protection link group.

The step of performing label encapsulation according to the queried-out forwarding information of the MSPW protection link group includes: performing the label encapsulation according to the forwarding information of the effective protection link.

Embodiment 2

Figure 2:
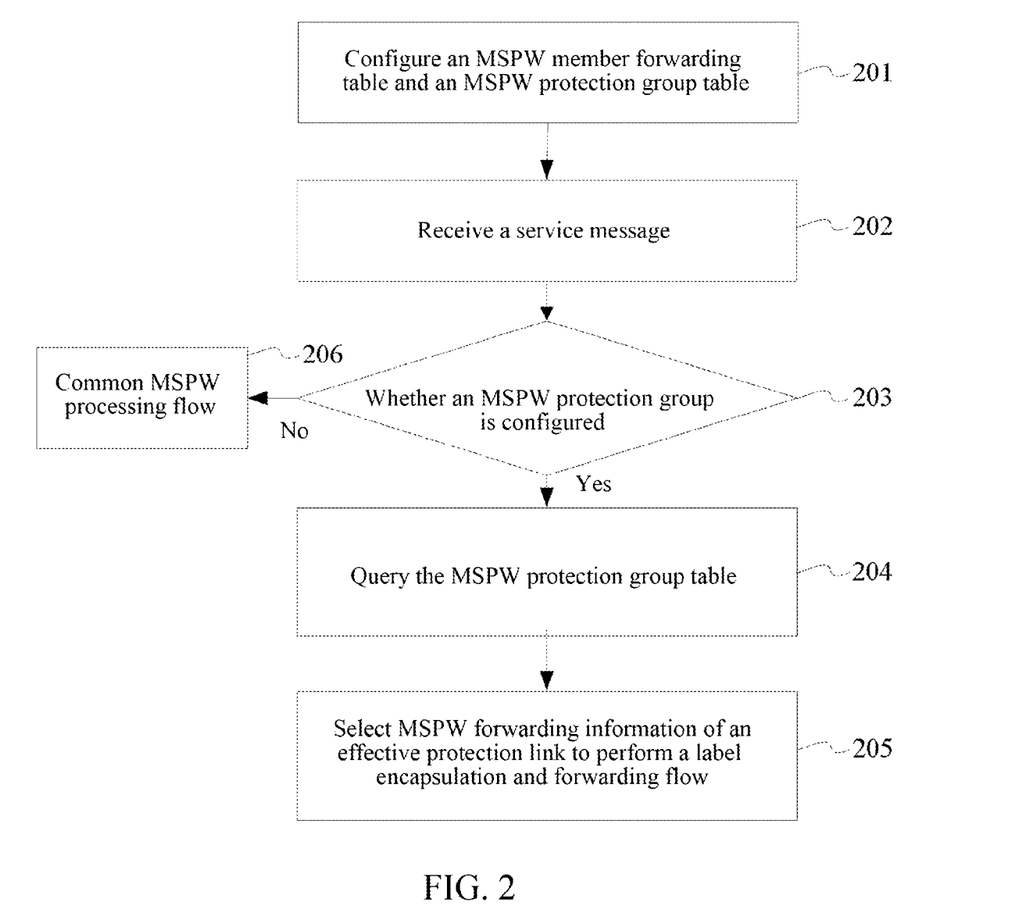
FIG. 2 is a flow diagram of a method for processing data forwarding of an embodiment 2 of the present document.

An embodiment 2 of a method for processing data forwarding of the present document, as shown in FIG. 2, includes the following steps:

In step 201, a Service Provider-end Provider Edge (SPE) configures an MSPW member forwarding table and an MSPW protection group table;

In this embodiment 2, the MSPW member forwarding table and the MSPW protection group table are a specific representation form, the corresponding relationship between Multi Segment Pseudo Wires (MSPW) information and forwarding information of an MSPW protection link group or between MSPW information and forwarding information of other MSPW except the forwarding information of the MSPW protection link group can be embodied by using the MSPW member forwarding table and the MSPW protection group table.

Certainly, the above MSPW member forwarding table and MSPW protection group table also can be integrated into one table to be represented, or can be divided into 3 tables reasonably.

The contents in the MSPW member forwarding table are an MSPW protection group table flag, an MSPW protection group index, a forwarding label, a PW label, and an output interface; the contents in the MSPW protection group table are an effective MSPN protection link serial number, the number of protection links, as well as a protection link serial number of each protection link, a protection link forwarding label of each protection link, a protection link MSPW label of each protection link, and an output interface of each protection link.

Wherein the number of the protection links can be selectable. A protection relationship of multiple standby protection links protecting one effective protection link (also can be called as a main protection link) can be configured in one MSPW protection group table, and priorities can be set, and a protection link with a high priority is in the front part of the MSPW protection table structure.

Understandably, in the MSPW member forwarding table, if the MSPW protection group table flag represents that the corresponding MSPW protection group exists, the MSPW protection group index in the corresponding table item is valid information, but the forwarding label, the PW label and the output interface are invalid information; accordingly, if the MSPW protection group table flag represents that the corresponding MSPW protection group does not exist, the MSPW protection group index in the corresponding table item is invalid information, but the forwarding label, the PW label and the output interface are valid information.

The specific contents of the MSPW member forwarding table and the MSPW protection group table given in the present embodiment are only a kind of implementation form, and the embodiments of the present document do not limit the contents of the tables.

Figure 3:
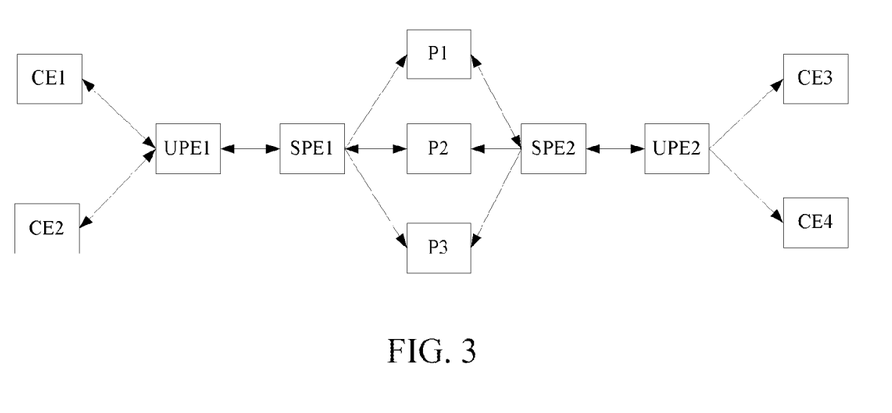
FIG. 3 is a schematic diagram of a networking structure of applying the method for processing data forwarding of an embodiment of the present document.

For example, in the networking shown in FIG. 3, taking the device SPE1 as an example, the MSPW member forwarding table includes CE1-CE3 MSPW1, an MSPW protection group table flag, an MSPW protection group index, a forwarding label, a PW label and an output interface, wherein it is to judge whether the MSPW network configures an MSPW protection group through the MSPW protection group table flag, and the MSPW protection group table can be queried according to the MSPW protection group index; according to the networking of FIG. 3, the MSPW protection group table of the SPE1 contains 3 MSPW protection links, which are SPE1-P1-SPE2, SPE1-P2-SPE2, and SPE1-P3-SPE2 respectively; the priority of the link SPE1-P1-SPE2 is the highest and the serial number of the SPE1-P1-SPE2 is 1; next is the link SPE1-P2-SPE2 and the serial number of the SPE1-P2-SPE2 is 2; and the last is the link SPE1-P3-SPE2 and the serial number of the SPE1-P3-SPE2 is 3. Meanwhile, the MSPW protection group table includes information of the forwarding label, protection link MSPW label and output interface of the 3 protection links. Similarly, for user services of links CE1-CE4, CE2-CE3 and CE2-CE4 in the table 1, the structures of table items of the MSPW member forwarding table and the MSPW protection group table can be analogized though the structure of the table items of the CE1-CE3.

For the device SPE2, the MSPW link protection mechanism on a direction of a link CE3-CE1 is consistent with the MSPW link protection mechanism on the direction of the link CE1-CE3 in the device SPE1, and the content structures of the MSPW member forwarding table and the MSPW protection group table on the device SPE2 can be analogized according to the MSPW member forwarding table and the MSPW protection group table on the device SPE1.

TABLE 1

| MSPW member forwarding table (SPE1) | | | | | |
|---|---|---|---|---|---|
| MSPW information | Forwarding information | | | | |
| CE1-CE3 MSPW1 | MSPW protection group table flag | MSPW protection group index | Forwarding label | PW label | Output interface |
| CE1-CE4 MSPW2 | MSPW protection group table flag | MSPW protection group index | Forwarding label | PW label | Output interface |
| CE2-CE3 MSPW3 | MSPW protection group table flag | MSPW protection group index | Forwarding label | PW label | Output interface |
| CE2-CE4 MSPW4 | MSPW protection group table flag | MSPW protection group index | Forwarding label | PW label | Output interface |

TABLE 2

MSPW protection group table (SPE1)

| MSPW protection group index | MSPW protection information | | |
|---|---|---|---|
| | MSPW protection group | Effective protection link serial number | Number of protection links | Protection link serial number, forwarding label, MSPW label, output interface |
| MSPW protection group 1 | Protection link serial number1 | 3 | Serial number 1, forwarding label of link SPE1-P1-SPE2, MSPW label, output interface Serial number 2, forwarding label of link SPE1-P2-SPE2, MSPW label, output interface Serial number 3, forwarding label of link SPE1-P3-SPE2, MSPW label, output interface |

TABLE 3

MSPW member forwarding table (SPE2)

| MSPW information | Forwarding information | | | | |
|---|---|---|---|---|---|
| CE3-CE1 MSPW1 | MSPW protection group table flag | MSPW protection group index | Forwarding label | PW label | Output interface |
| CE4-CE1 MSPW2 | MSPW protection group table flag | MSPW protection group index | Forwarding label | PW label | Output interface |
| CE3-CE2 MSPW3 | MSPW protection group table flag | MSPW protection group index | Forwarding label | PW label | Output interface |
| CE4-CE2 MSPW4 | MSPW protection group table flag | MSPW protection group index | Forwarding label | PW label | Output interface |

TABLE 4

MSPW protection group table (SPE2)

| MSPW protection group index | MSPW protection information | | |
|---|---|---|---|
| | MSPW protection group | Effective protection link serial number | Number of protection links | Protection link serial number, forwarding label, MSPW label |
| MSPW protection group 1 | Protection link serial number 1 | 3 | Serial number 1, forwarding label of link SPE2-P1-SPE1, MSPW label, output interface Serial number 2, forwarding label of link SPE2-P2-SPE1, MSPW label, output interface Serial number 3, forwarding label of link SPE2-P3-SPE1, MSPW label, output interface |

For example, in the networking shown in FIG. 3, three protection links are configured for the device SPE1, when the protection link SPE1-P1-SPE2 fails, the serial number of the effective MSPW protection link in the MSPW protection group table is modified to be the link SPE1-P2-SPE2 with the second priority, and the forwarding information is sent to the output interface of the link SPE1-P2-SPE2 by using the forwarding label and the MSPW label of the link SPE1-P2-SPE2, so as to implement the forwarding function of the MSPW protection group. Similarly, when the link SPE1-P2-SPE2 fails, it is to switch to the link SPE1-P3-SPE2, and forwarding is performed according to the information of the link SPE1-P3-SPE2 in the MSPW protection group table.

In step 202: the service message is received, and the service message carries the MSPW label;

In step 203: it is to judge whether an MSPW protection group is configured by querying the MSPW member forwarding table, if the MSPW protection group is configured, step 204 is executed, and if the MSPW protection group is not configured, step 206 is executed;

In this step, the MSPW member forwarding table is queried according to the MSPW label, and it is to judge whether the MSPW network configures an MSPW protection group service according to the MSPW protection group table flag in the MSPW member forwarding table; if the MSPW protection group service is configured, then step 204 is executed, i.e., the MSPW protection group table is searched and MSPW protection processing is performed according to the MSPW protection group table; and if the MSPW protection group service is not configured, a common MSPW forwarding processing flow is performed.

For example, in the networking shown in FIG. 3, taking the device SPE1 as an example, through the link CE1-CE3, the MSPW member forwarding table is queried according to the MSPW label, and it is to judge whether the MSPW network configures an MSPW protection group service, if the MSPW protection group service is configured, then it is needed to search the MSPW protection group table according to the MSPW protection group index in the MSPW member forwarding table, and the processing of step 204 is performed; and if the MSPW protection group service is not configured, the common MSPW forwarding processing of step 206 is performed, i.e., the existing standard MSPW processing flow, and the processing flow thereof is not described any more in the patent. Similarly, the service processing between other CEs can be analogized.

In step 204: the MSPW protection group table is queried.

In the step, the MSPW protection group table is searched according to the MSPW protection group index in the MSPW member forwarding table, the MSPW protection group table includes the effective MSPW protection link serial number, the number of protection links, the protection link serial number, as well as the protection link forwarding label, the protection link MSPW label and the output interface of each protection link. Information of the corresponding protection link is selected according to the effective protection link serial number, i.e., the protection link serial number, the protection link forwarding label, the protection link MSPW label and the output interface in the MSPW protection group table.

For example, in the networking shown in FIG. 2, taking the MSPW protection group table on the device SPE1 as an example, three protection links, SPE1-P1-SPE2, SPE1-P2-SPE2, SPE1-P3-SPE2, are configured in the network, thus the number of the protection links is 3 in the MSPW protection group table; the priorities of the 3 protection links are ordered from high to low as SPE1-P1-SPE2, SPE1-P2-

SPE2, SPE1-P3-SPE2 in turn, and thus the parts of the protection link serial number, the protection link forwarding label, the protection link MSPW label and the output interface are also sequenced according to the priority order in turn in the MSPW protection group table, i.e., the serial number is the highest, and thus the priority is the highest; when the link SPE1-P1-SPE2 is normal, the effective MSPW protection link serial number in the MSPW protection group table is 1, then the link SPE1-P1-SPE2 with the protection link serial number 1 is selected to perform forwarding; when the link SPE1-P1-SPE2 fails, the serial number of the effective MSPW protection link in the MSPW protection group table is modified to be the link SPE1-P2-SPE2 with the second priority; if the SPE1-P3-SPE2 also fails, the effective MSPW protection link serial number in the MSPW protection group table is switched to 3, forwarding is performed according to the protection link forwarding label, the protection link MSPW label and the output interface of the protection link serial number 3, so as to implement the function of the MSPW protection group. Similarly, the function of the MSPW protection group of the device SPE2 can be analogized.

In step 205: forwarding information of the effective protection link is selected to perform a label encapsulation and forwarding flow;

In the step, the forwarding information corresponding to the protection link serial number is selected according to the effective MSPW protection link serial number of the MSPW protection group table to perform the message label encapsulation and forwarding flow. The MSPW protection group table contains information of the forwarding label, the MSPW label and the output interface of the protection link, the forwarding label of the protection link is encapsulated in the message, the original MSPW label in the message is replaced with the MSPW label in the MSPW protection group table, and sending is performed to the output interface of the protection link, to implement the forwarding function of the MSPW protection group.

For example, in the networking shown in FIG. 3, for the device SPE1, three protection links are configured, when the protection link SPE1-P1-SPE2 fails, the effective MSPW protection link serial number in the MSPW protection group table is modified to be the link SPE1-P2-SPE2 with the second priority, the forwarding information is sent to the output interface of the link SPE1-P2-SPE2 by using the forwarding label and the MSPW label of the link SPE1-P2-SPE2, to implement the forwarding function of the MSPW protection group. Similarly, when the link SPE1-P2-SPE2 fails, it is to switch to the link SPE1-P3-SPE2, and forwarding is performed according to the information of this link in the MSPW protection group table.

In step 206: the common MSPW forwarding processing is performed.

Correspondingly, the label encapsulation and forwarding flow is performed according to the forwarding information in the MSPW member forwarding table.

Figure 4:
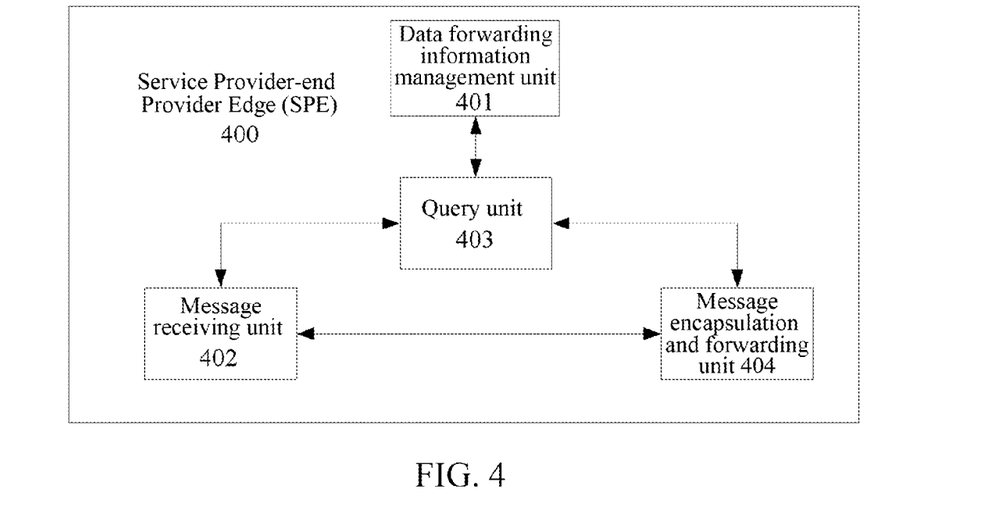
FIG. 4 is a schematic diagram of a modular structure of a Service Provider-end Provider Edge (SPE) of an embodiment of the present document.

In order to implement the above method, the embodiment of the present document also provides a Service Provider-end Provider Edge (SPE) 400, and as shown in FIG. 4, the SPE 400 includes: a data forwarding information management unit 401, a message receiving unit 402, a query unit 403 and a message encapsulation and forwarding unit 404; wherein, the data forwarding information management unit 401 is configured to: configure data forwarding information, wherein the data forwarding information includes a corresponding relationship between Multi Segment Pseudo Wires (MSPW) information and forwarding information of an MSPW protection link group or a corresponding relationship between MSPW information and forwarding information of other MSPW except the forwarding information of the MSPW protection link group;

the message receiving unit 402 is configured to: receive a service message, wherein the service message carries the MSPW information;

the query unit 403 is configured to: query the forwarding information of the MSPW protection link group or the forwarding information of other MSPW except the forwarding information of the MSPW protection link group corresponding to the MSPW information carried in the service message according to the corresponding relationship between the MSPW information and the forwarding information of the MSPW protection link group or the corresponding relationship between the MSPW information and the forwarding information of other MSPW except the forwarding information of the MSPW protection link group; and the message encapsulation and forwarding unit 404 is configured to: perform label encapsulation and forwarding according to the queried-out corresponding forwarding information of the MSPW protection link group or forwarding information of other MSPW except the forwarding information of the MSPW protection link group.

Accordingly, the forwarding information of the MSPW protection link group includes forwarding information of at least one effective protection link and forwarding information of at least one standby protection link.

Optionally, the message encapsulation and forwarding unit is configured to perform label encapsulation according to the queried-out forwarding information of the MSPW protection link group in the following way: performing the label encapsulation according to the forwarding information of the effective protection link.

Optionally, the data forwarding information management unit is further configured to configure the data forwarding information in the following way: selecting one standby protection link as a new effective protection link when determining that the current effective protection link fails.

The SPE selects from all standby protection links a protection link with the highest priority as the new effective protection link.

An ordinary person skilled in the art can understand that all or part of steps in the above method can be completed by a program instructing relevant hardware, and the program may be stored in a computer readable storage medium, such as a readable memory, a magnet disk or an optical disk, etc. Optionally, all or part of steps of the above embodiments also can be implemented by means of one or a plurality of integrated circuits. Accordingly, the respective module/unit in the above embodiments can be implemented in a form of hardware, or be implemented in a form of software function module. The present document is not limited to any combination of hardware and software in a specific form.

The above description is only a specific embodiment of the present document, but the protection scope of the present document is not limited to this. Changes or substitutions that can be easily conceived by the related skilled people familiar to the art within the technical scope disclosed by the present document should all fall into the protection scope of the present document. Thus, the protection scope of the present document should be subject to the appending claims.

INDUSTRIAL APPLICABILITY

In the embodiments of the present document, the forwarding performance of the PWE3 MSPW function can be improved; by implementing the MSPW protection group function of MSPW, the service flow can be switched quickly when there is a fault on the MSPW link, thereby effectively protecting the service flow, preventing the service flow from cutting off and increasing the robustness of the MSPW network, so the requirements of network operators can be met better. Therefore, the present document has a very strong industrial applicability.

What we claim is:

1. A method for processing data forwarding, comprising:
a Service Provider-end Provider Edge (SPE) configuring data forwarding information, wherein the data forwarding information comprises a corresponding relationship between Multi Segment Pseudo Wires (MSPW) information and forwarding information of an MSPW protection link group or a corresponding relationship between the MSPW information and forwarding information of other MSPW except the forwarding information of the MSPW protection link group;
the SPE receiving a service message, wherein the service message carries the MSPW information;
the SPE querying the forwarding information of the MSPW protection link group or the forwarding information of other MSPW except the forwarding information of the MSPW protection link group corresponding to the MSPW information carried in the service message according to the corresponding relationship between the MSPW information and the forwarding information of the MSPW protection link group or the corresponding relationship between the MSPW information and the forwarding information of other MSPW except the forwarding information of the MSPW protection link group; and
the SPE performing label encapsulation and forwarding according to the queried-out forwarding information of the MSPW protection link group or the forwarding information of other MSPW except the forwarding information of the MSPW protection link group.

2. The method for processing data forwarding of claim 1, wherein, the forwarding information of the MSPW protection link group comprises forwarding information of at least one effective protection link and forwarding information of at least one standby protection link.

3. The method for processing data forwarding of claim 2, wherein, the step of performing label encapsulation according to the queried-out forwarding information of the MSPW protection link group comprises:
performing the label encapsulation according to the forwarding information of the effective protection link.

4. The method for processing data forwarding of claim 2, further comprising:
the SPE selecting one standby protection link as a new effective protection link when determining that a current effective protection link fails.

5. The method for processing data forwarding of claim 4, wherein, the SPE selects from all standby protection links a protection link with a highest priority as the new effective protection link.

6. A Service Provider-end Provider Edge (SPE), comprising hardware performing instructions stored in a non-transitory computer readable medium which executes steps in following units: a data forwarding information management unit, a message receiving unit, a query unit and a message encapsulation and forwarding unit, wherein,
the data forwarding information management unit is configured to: configure data forwarding information, wherein the data forwarding information comprises a corresponding relationship between Multi Segment Pseudo Wires (MSPW) information and forwarding information of an MSPW protection link group or a corresponding relationship between the MSPW information and forwarding information of other MSPW except the forwarding information of the MSPW protection link group;
the message receiving unit is configured to: receive a service message, wherein the service message carries the MSPW information;
the query unit is configured to: query the forwarding information of the MSPW protection link group or the forwarding information of other MSPW except the forwarding information of the MSPW protection link group corresponding to the MSPW information carried in the service message according to the corresponding relationship between the MSPW information and the forwarding information of the MSPW protection link group or the corresponding relationship between the MSPW information and the forwarding information of other MSPW except the forwarding information of the MSPW protection link group; and
the message encapsulation and forwarding unit is configured to: perform label encapsulation and forwarding according to the queried-out forwarding information of the MSPW protection link group or the forwarding information of other MSPW except the forwarding information of the MSPW protection link group.

7. The SPE of claim 6, wherein, the forwarding information of the MSPW protection link group comprises forwarding information of at least one effective protection link and forwarding information of at least one standby protection link.

8. The SPE of claim 7, wherein, the message encapsulation and forwarding unit is configured to perform label encapsulation according to the queried-out forwarding information of the MSPW protection link group in the following way: performing the label encapsulation according to the forwarding information of the effective protection link.

9. The SPE of claim 7, wherein, the data forwarding information management unit is further configured to configure the data forwarding information in the following way: selecting one standby protection link as a new effective protection link when determining that a current effective protection link fails.

10. The SPE of claim 9, wherein, the SPE selects from all standby protection links a protection link with a highest priority as the new effective protection link.

* * * * *